United States Patent [19]
Gliemeroth

[11] 4,108,674
[45] Aug. 22, 1978

[54] PHOTOTROPIC OPTICAL GLASS

[75] Inventor: Georg Gliemeroth, Finthen, Fed. Germany

[73] Assignee: Jenaer Glaswerk Schott & Gen., Mainz, Germany

[21] Appl. No.: 733,046

[22] Filed: Oct. 18, 1976

Related U.S. Application Data

[63] Continuation of Ser. No. 541,671, Jan. 16, 1975, abandoned, which is a continuation-in-part of Ser. No. 496,437, Aug. 9, 1974, abandoned.

[30] Foreign Application Priority Data

Feb. 1, 1974 [DE] Fed. Rep. of Germany ....... 2404752

[51] Int. Cl.$^2$ .............................................. C03C 3/26
[52] U.S. Cl. ..................... 106/53; 65/30 R; 106/47 Q; 106/52; 106/DIG. 6; 252/300; 350/353
[58] Field of Search ..................... 106/DIG. 6, 47, 52, 106/53; 350/160 P; 65/30

[56] References Cited

U.S. PATENT DOCUMENTS 3,656,923  4/1972  Garfinckel et al. ........... 106/DIG. 6
3,876,436  4/1975  Lythgoe ............................ 106/52 X
3,957,498  5/1976  Reade ..................................... 106/52

OTHER PUBLICATIONS

Kreidl, N. J.—"Phase Separation," Glass Industry, Aug. 1970, pp. 356, 360–361.
Tsekhomskii, V. A. et al.—"Phase Separation Phenomena in Glasses," Pub. N.Y. 1973, Edited by Porai-Roshits—"Photochemism & Microphase Separation of Glass," pp. 172–175, Original Russian Language Publ'n. 1969.
Galakhova, G. S. et al.—Chem. Abstracts 73, (1970), 123146S, "Effect of the Type of Glass-Forming Compounds in the State of Light-Sensitive Components in Glass".
Vargin, V. V. et al.—"Silver Chloride Photochromic Glasses"—Optiko-Mekham Prom. (1968), 35 (1), pp. 35–42, (Russ.), pp. 38–44, Eng.
Pavlushkin, V. V. et al.—"Effects of Technological Factors on the Photochromic Properties of Glasses Containing Silver Halides," Chem. Abstracts, 68, (1968).

Primary Examiner—Helen M. McCarthy
Attorney, Agent, or Firm—Millen & White

[57] ABSTRACT

A phototropic glass containing $P_2O_5$ as the principal component and, as agents imparting phototropy, silver and halogen in non-crystalline form.

5 Claims, No Drawings

PHOTOTROPIC OPTICAL GLASS

This is a continuation of application Ser. No. 541,671 filed Jan. 16, 1975, which is a continuation-in-part of Ser. No. 496,437, filed Aug. 9, 1974, both now abandoned.

The instant application provides an improvement in my application Ser. No. 118,513, filed Feb. 24, 1971, now U.S. Pat. No. 3,834,912, which is a continuation-in-part of Ser. No. 685,596, filed Nov. 24, 1967, which applications are incorporated herein by reference.

BACKGROUND

A variety of phototropic glasses are already known. Early work in the field is disclosed in Armisteat U.S. Pat. No. 3,208,860 (German Pat. No. 1,421,838) where the base glass is a silicate or a borosilicate glass. The activating agent, i.e. the component imparting phototropy, is silver halide in the form of crystals or microcrystals.

Later, phototropic glasses in which the base glass is a borate glass, were developed. Here also the activating agent is silver halide in the form of crystals. Such glasses are disclosed in U.S. Pat. No. 3,548,060 assigned to Nippon, and Gliemeroth U.S. Pat. No. 3,834,912 (German Pat. No. 1,596,847).

Phototropic glasses in which the base glass is a phosphate glass are also known. Sakka and McKenzie, J. Amer. Ceram. Soc. 55, 1972, 553 disclose such glasses. The activating agent or combination imparting or imparting and affecting phototropy is thallium chloride, or thallium chloride and $Cu_2O$, or thallium chloride and silver oxide. Those authors, in U.S. Pat. No. 3,615,761, disclose phosphate phototropic glasses in which the activating agent is thallium chloride. A description of phototropic phosphate glasses that is comprehensive in regard to the breadth of the possible compositions is available in German Offenlegungsschrift (DOS) No. 2,234,283, (equivalent to U.S. Patent of Lythgol No. 3,876,436) assigned to Pilkington Brothers, Ltd. Here also, silver halide crystals dispersed in the glass result in phototrophy. Thus, the last mentioned phototropic phosphate glasses differ from phototropic glasses on a silicate, borosilicate, or borate basis, such as are described above, only in the composition of the base glass.

Glasses of one or more oxides are composed of networks of the principal components. The principal components are bound to the network in the form of coordination polyhedra joined at the apexes. These structure units (principal components) are $SiO_4$ tetrahedra in silicate glasses, for example; similar units of structure exist in borate and phosphate glasses. These units of structure are bounded together with different strengths in different glasses. The more strongly the central cations of these structures polarize the surrounding oxygens, the more weakly they are bonded to adjacent units of structure (e.g., to the adjacent tetrahedron). The polarization of the oxygens by the central cations is, according to Dietzel in Z. Elektrochem. 48 (1942), 9, as follows:

Table 1

| Central Cation | Valency in the Glass Z | Distance, a, in Angstroems Between Cation and Oxygens, a | Field Strength $Z/a^2$ |
|---|---|---|---|
| Si | 4 | 1.60 | 1.56 |
| B | 3 | 1.36 | 1.62 |
| P | 5 | 1.55 | 2.08 |

The greater the field strength of the central cation of such a structural unit is, the more strongly the surrounding oxygen envelope is polarized and the weaker becomes the bond of this unit of structure (consisting of the central cation and the surrounding oxygen envelope) externally to the adjacent units of structure.

Accordingly, the strength of the bond between the principal components diminishes, i.e., the overall glass structure loosens up, as one passes from silicate glasses to borate glasses or even to phosphate glasses.

In Gliemeroth U.S. Pat. No. 3,834,912 (German Pat. No. 1,596,847), phototropic glasses are disclosed whose phototropic properties are determined by silver halide crystals and in some cases small amounts of metallic silver, and which are distinguished in that they consist of one or more glass-forming oxides as principal components whose bond to one another in the glass is weaker than the bonds in a silicate base glass with $SiO_2$ as the glass-forming component.

In particular Gliemeroth U.S. Pat. No. 3,834,912 (German Pat. No. 1,596,847), describes borate glasses which have better phototropic properties than the silicate glasses which were known at the time, on account of the weaker bond between the principal components.

From the above considerations, which are generally accessible to the technical world, it appears that the phosphate glasses must also be suitable for the production of phototropic glass providing a good optical density variation under the influence of impinging light rays.

If, in accordance with the teaching of Gliemeroth U.S. Pat. No. 3,834,912 (German Pat. No. 1,596,847), the principal component $B_2O_3$ is replaced by $P_2O_5$, the bond between the principal components will become weaker in the resulting glass. On the basis of the examples given in the said patent we will then have the following compositions, which do have phototropic characteristics, but whose phototropy is of poorer quality. To facilitate comparison, compositions are given in parts by weight, as is done in Gliemeroth U.S. Pat. No. 3,834,912 (German Pat. No. 1,596,847).

Table 2

| $P_2O_5$-Modified Gliemeroth 3,834,912 Glasses | | | | | | |
|---|---|---|---|---|---|---|
| | 1 | 2 | 3 | 4 | 5 | 6 |
| $P_2O_5$ | 14.9 | 81.4 | 47.8 | 71.0 | 67.5 | 73.6 |
| PbO | 69.4 | — | 35.6 | — | — | — |
| MgO | — | — | — | 15.4 | 13.5 | — |
| BaO | — | — | — | — | 15.4 | — |
| ZnO | 9.90 | 10.2 | — | — | — | 9.20 |
| $Al_2O_3$ | 1.98 | — | 12.5 | 9.60 | — | — |
| $Na_2O$ | 0.10 | — | — | — | — | — |
| $K_2O$ | — | 5.08 | — | — | — | 7.40 |
| KCl | — | — | — | 0.48 | — | 0.92 |
| KBr | 1.49 | 1.53 | 1.44 | 1.44 | 1.45 | 1.38 |
| KI | 1.49 | 1.53 | 1.44 | 1.44 | 1.45 | 1.38 |
| LiF | 0.50 | — | 0.96 | 0.29 | 0.29 | 0.28 |
| $Ag_2O$ | 0.19 | 0.30 | 0.29 | 0.38 | 0.38 | 0.37 |
| CuO | 0.005 | — | 0.01 | — | 0.02 | 0.02 |
| $K_2Cr_2O_7$ | — | — | — | 0.01 | 0.005 | 0.01 |
| $ZrO_2$ | — | — | — | — | — | 5.52 |
| | 99.555 | 100.04 | 100.04 | 100.04 | 99.995 | 100.08 |

As it has already been explained in Gliemeroth U.S. Pat. No. 3,834,912 (German Pat. No. 1,596,847), the use of small amounts of $SiO_2$ contributes toward stabilization. This makes the structure of the glass stronger again. In accordance, therefore, with Gliemeroth U.S. Pat. No. 3,834,912 (German Pat. No. 1,596,847), glasses are possible, in view of the above consideration, which are listed by way of example in Table 3. These glasses are listed in parts by weight to facilitate comprehension, as is done in the German patent.

Table 3

SiO$_2$- and P$_2$O$_5$- Modified Gliemeroth 3,834,912 Glasses

|  | 7 | 8 | 9 | 10 | 11 |
|---|---|---|---|---|---|
| SiO$_2$ | 4.49 | 3.10 | 2.99 | 8.55 | 7.46 |
| B$_2$O$_3$ | 6.00 | 5.05 | 4.00 | 7.05 | 7.56 |
| P$_2$O$_5$ | 39.33 | 33.75 | 32.73 | 30.19 | 34.62 |
| PbO | — | 5.79 | 27.35 | — | 1.99 |
| MgO | 6.99 | 11.57 | 1.54 | 3.16 | — |
| BaO | 10.93 | 12.78 | 4.61 | 6.52 | 5.17 |
| ZnO | 0.44 | — | — | — | — |
| CaO | — | — | — | 6.92 | 4.87 |
| ZrO$_2$ | 1.75 | — | — | — | 1.99 |
| TiO$_2$ | — | — | — | 0.49 | 0.99 |
| Al$_2$O$_3$ | 17.48 | 12.05 | 9.60 | 21.51 | 18.90 |
| Na$_2$O | 4.81 | 12.15 | 6.45 | 5.93 | 5.97 |
| K$_2$O | 6.12 | 1.93 | 4.07 | 6.92 | 8.46 |
| KCl | 0.70 | 0.39 | 2.31 | 0.99 | 0.90 |
| KBr | 0.35 | 1.16 | 1.38 | 0.99 | 0.40 |
| KI | 0.09 | — | — | — | — |
| LiF | 0.36 | — | 0.77 | — | 0.50 |
| Ag$_2$O | 0.17 | 0.29 | 0.19 | 0.18 | 0.18 |
| CuO | 0.02 | — | — | 0.02 | 0.04 |
| KHF$_2$ | — | — | — | 0.59 | — |
|  | 100.03 | 100.01 | 97.99 | 100.01 | 100.00 |

Examples 7 to 11 also show that a certain amount of B$_2$O$_3$ can be incorporated into such phototropic phosphate glasses.

Phosphate glasses are generally known for their particularly poor chemical stability. This can be counteracted by a high Al$_2$O$_3$ content, but this will result in a further impairment of the already poor resistance to devitrification.

A glass which is to be used in eyeglass lenses (long-focus portion of bifocal lenses) must satisfy certain requirements in regard to commercial profitability. This means that the yield from normal production machinery and equipment must be satisfactory and the product must not be the cause of great numbers of complaints.

In the glass making apparatus commonly used today for production of glass for eyeglass lenses, glasses can be worked which assure a throughput of more than 60 kg/h. To this end the glass must be cut into portions by shearing, at a viscosity of $10^3$ to $10^{4.5}$ poises, in order then to be pressed into blanks. At this viscosity, which is relatively high for molten glass, many non-silicate glasses devitrify at such high rates that profitable production becomes impossible. To counteract this deficiency, it is possible to resort to viscosity reduction and to special methods of production (inasmuch as portioning by shearing is no longer possible at low viscosities), or to accept a reduction of output by temporarily interrupting production and clearing up any devitrification that may have occurred in production by briefly raising the temperature.

All of the exemplified glasses of the aforementioned Pilkington DOS No. 2,234,283 (Lythgol U.S. Pat. No. 3,876,436) which discloses phosphate glasses activated with silver halide crystals, have been melted again with this in mind and tested for devitrification. After 60 melts it is apparent that those compositions do not qualify for normal production, discussed above, on a technical scale.

The qualifications which any glass must meet for use in eyeglasses are established by the following specifications which are generally recognized by the industry:

(a) Index of refraction $n_d$ between 1.5225 and 1.5238.
(b) No devitrification between $10^2$ and $10^{4.5}$ poises.
(c) Sufficient chemical stability (characterized by resistance to hydrolysis in accordance with DIN 12,111 and by the ability to withstand the sweat test).
(d) Sufficient chemical hardenability in the standard bath for normal optical crown glass (this requirement normally applies wherever strength improvement is legally prescribed for all eyeglass lenses).

THE INVENTION

The object of the present invention is an improved phototropic optical glass for eyeglasses, meeting the above-mentioned requirements, and which comprises one or more glass forming oxides as principal component or components, whose bonding together in the glass is weaker than the bonding in a silicate basic glass containing SiO$_2$ as the main glass forming component, and likewise is weaker than it is in a borate base glass containing B$_2$O$_3$ as the principal glass forming component.

Another object of the invention is an improved phototropic spectacle glass having an index of refraction $n_d$ between 1.5225 and 1.5238 as well as the other requirements of (a) to (d) above.

Another object of the invention is an improved phototropic spectacle glass having little or no devitrification in the viscosity range between $10^1$ and $10^5$ poises, having a chemical stability that is sufficient for use in the long-focus portion of bifocal eyeglass lenses, and preferably having a linear thermal expansion coefficient between 20° and 300° C of below $105 \times 10^{-7}$ per ° C, e.g. from 99 to $105 \times 10^{-7}$ per ° C.

Another object of the invention is an improved phototropic spectacle glass which can be strengthened by an ion exchange below the transformation temperature in a medium containing potassium ions, in which smaller alkali ions are able to diffuse out of the glass.

These objects are achieved by the invention in that, in the phototropic glass of German Pat. No. 1,596,847 (U.S. Pat. No. 3,834,912). B$_2$O$_3$ is replaced by P$_2$O$_5$, and that the phototropic properties in the glass of the invention are produced through the creation of silver-rich and halide-rich, noncrystalline, separation phases in this glass.

In accordance with the invention, the P$_2$O$_5$ content is best between 30.4 and 33.9% by weight.

Furthermore, in accordance with the invention, the Al$_2$O$_3$ content is best increased from 14 wt% to about 23 wt-%, a suitable range being between 22.5 and 25.7 wt-%.

The conventional phototropic glasses containing silver and halogen display good phototropy only when they contain B$_2$O$_3$; B$_2$O$_3$-free glasses of the prior art have either little or unsatisfactory phototropy. In Table 4 are listed glasses with B$_2$O$_3$ and which are prior art glasses, and the same glasses except without B$_2$O$_3$, showing their phototropic properties. To facilitate comprehension, this table is given in parts by weight. The compositions given are on a batch basis. The glasses are not according to the invention.

Table 4

Effect of B$_2$O$_3$ in Prior Art Glasses

|  | 12 | 13 | 14 | 15 | 16 | 17 | 18 | 19 |
|---|---|---|---|---|---|---|---|---|
| SiO$_2$ | 61.5 | 61.5 | 7.5 | 7.5 | 9.1 | 9.1 | 50.0 | 53.0 |
| B$_2$O$_3$ | — | 16.6 | — | 4.0 | — | 5.0 | — | 18.0 |
| P$_2$O$_5$ | — | — | 36.5 | 36.5 | 35.0 | 35.0 | 2.0 | 2.0 |

Table 4-continued

| | Effect of $B_2O_3$ in Prior Art Glasses | | | | | | | |
|---|---|---|---|---|---|---|---|---|
| | 12 | 13 | 14 | 15 | 16 | 17 | 18 | 19 |
| $Al_2O_3$ | 10.7 | 10.7 | 22.5 | 22.5 | 25.0 | 25.0 | 8.0 | 8.0 |
| $ZrO_2$ | — | — | — | — | — | — | 1.0 | 1.0 |
| $Na_2O$ | 10.7 | 10.7 | 6.5 | 6.5 | 6.5 | 6.5 | 4.0 | 4.0 |
| $K_2O$ | — | — | 6.5 | 6.5 | 8.0 | 8.0 | 1.0 | 1.0 |
| MgO | — | — | 4.4 | 4.4 | 3.4 | 3.4 | 2.0 | 2.0 |
| CaO | — | — | 9.0 | 9.0 | 6.9 | 9.0 | — | — |
| BaO | — | — | 6.7 | 6.7 | 6.7 | 6.7 | 4.0 | 4.0 |
| PbO | — | — | — | — | — | — | 6.0 | 6.0 |
| $TiO_2$ | — | — | 1.0 | 2.0 | 0.5 | 0.5 | — | — |
| $Ag_2O$ | 0.6 | 0.6 | 0.14 | 0.14 | 0.18 | 0.18 | 0.42 | 0.42 |
| CuO | 0.01 | 0.01 | 0.02 | 0.02 | 0.01 | 0.01 | — | — |
| Cl | — | — | 0.6 | 0.6 | 0.6 | 0.6 | 1.0 | 1.0 |
| Br | 0.8 | 0.8 | 0.3 | 0.3 | 0.3 | 0.3 | 0.5 | 0.5 |
| F | 2.5 | 2.5 | 0.1 | 0.1 | 0.3 | 0.3 | — | — |
| | 86.81 | 103.41 | 101.76 | 106.76 | 102.49 | 109.59 | 79.92 | 100.92 |
| Annealing | 1 h 610° | 1 h 610° | 2 h 580° | 2 h 580° | 1 h 620° | 1 h 620° | 1 h 640° | 1 h 640° |
| Saturation | No Darkening | 40% | 6% | 53% | 12% | 68% | No Darkening | 44% |
| Transmission after exposure to light | | | | | | | | |
| Regeneration after 10 minutes | — | 20% | 2% | 24% | 4% | 27% | — | 17% |

From Table 4, it appears that the omission of the component $B_2O_3$ impairs phototropy. The effort has always been made, therefore, to include a minimum of $B_2O_3$ in the glass so as to favor the precipitation of the silver halide crystals (microcrystals, as they are described, for example in German Pat. No. 1,421,838 (Armistead U.S. Pat. No. 3,208,860) and German Pat. No. 1,596,847 (Gliemeroth U.S. Pat. No. 3,834,912)) and prevent it from being disturbed by other phase separations.

It has now quite surprisingly been found that, even in the complete absence of $B_2O_3$, glasses having phototropic properties can be obtained, which are at least equal in quality to those of glasses in which the phototropy is produced by silver halide crystals (the just mentioned German Pat. Nos. 1,421,838 and 1,596,847, and the aforementioned Pilkington DOS No. 2,234,283). The glasses of the invention can even display phototropy which is superior to that of the known glasses as regards degree of darkening and speed of regeneration.

It has still more surprisingly been found that in the glasses of the invention the phototropy is brought about, not by silver halide crystals, but by noncrystalline separation phases rich in silver halide.

To achieve particularly suitable precipitation conditions for the noncrystalline silver-rich and halogen-rich separation phases, the maximum phosphorus pentoxide content should be 33.9% by weight. If the $P_2O_5$ is less than 30.4, phototropy is poor, melting is rendered difficult, and the refractive index is too high.

Also, to prevent crystallization of the silver-rich and halogen-rich separation phases, the halogens must be especially selected. Fluorine is not used as the halogen; even in small concentration it appears to promote the crystallization of the separation phases. It is best if the glass is free of fluorine.

It has furthermore been found that, for profitable manufacture, a viscosity which is relatively high for phosphate glasses, ranging between $10^1$ and $10^5$ poises, is necessary, but that at a silicon dioxide content between 12.1 and 13.9 wt-% it is in general simultaneously necessary to keep the MgO content as low as possible, preferably at 0 wt-% since MgO has a great influence on the crystallization of the base glass (this base glass crystallization is to be distinguished from the crystallization of the silver halogen crystals or of the silver halogen-rich, noncrystalline separation phases, as the case may be, which are the phototropic agents).

Devitrification is also influenced by other components. Thus, it has been found that the titanium dioxide concentration should best not exceed 0.6 wt-%, but on the other hand that zirconium dioxide should best be present at least in a concentration exceeding 1 wt-%, although both of these components are known to be nucleating agents which promote devitrification. For optical reasons the maximum zirconium dioxide content is best 2.6 wt-%, because otherwise the index of refraction of the glass would exceed the required level of 1.5225 to 1.5238. The same applies to the maximum content of lanthanum oxide at 2.0 wt-%. Both components have an additional importance in producing sufficient chemical stability in the glass. Furthermore, zirconium dioxide should best be contained in the glass in a minimum amount of 1.0 wt-% and lanthanum oxide in a minimum amount of 0.05 wt-%, since these components also are the basis of an effect on the precipitation of the noncrystalline, silver halogen-rich separation phases.

The alkali oxide and alkali earth oxide (CaO, BaO, SrO) content affects not only the kinetics of the precipitation of the noncrystalline, silver halogen-rich separation phases, but also the other properties of the glass. It has been found that the sum of the alkali oxides should preferably be between 11.2 and 16.2 wt-%, which is especially important also for the possibility of strengthening the glass chemically by ion exchange below $10^{14.5}$ poises in a medium containing potassium ions, e.g., in a melt of $KNO_3$, in which smaller alkali ions diffuse out of the glass. It was found that, contrary to expectations, lithium oxide should best be contained in the starting glass in the smallest possible concentration, and preferably it should not be present at all, prior to the ion exchange, although in the phototropic glasses known hitherto lithium oxide plays an important part in the crystallization of the silver halide crystals.

Alkali earth oxides have a great effect not only on phase separation but also on the linear coefficient of thermal expansion. It has been found that a total alkali earth oxide content of at least 8.6 wt-%, but no more than 12.5 wt-%, is especially favorable.

Barium oxide and calcium oxide can be used with good results, but it is best if there is not more than 5.0 wt-% of calcium oxide because otherwise the precipitation of the silver halogen-rich, non-crystalline separation phases is disturbed. Small amounts of strontium oxide have a stabilizing effect. Lead oxide (PbO) is especially desirable at a content between 0.4 and 2.5 wt-%, can can be used for correction of the index of refraction the same as titanium dioxide.

The content of silver oxide and halogens in the mixture computed according to synthesis will depend on the melting process and the rest of the batch composition. Approximately 0.05 to 0.5 wt-% Ag, calculated as $Ag_2O$ and 0.2 to 1.0 wt-% halogen, in particular chlorine and bromine, are desired in the glass. (The amount stated for the silver oxide and halogen is computed for this purpose on the basis of the analytically determined (as is hereinafter described) content of silver ions and halogen ions present in the glass. A percentage of metallic silver is improbable, but possible. Silver ions and halogen ions do not need to be in a stoichiometric ratio to one another, since other components are also contained in the noncrystalline, silver halogen-rich separation phases.)

The desirable content of silver oxide and halogen in the batch synthesis, allowing for vaporization losses during the melting is between 0.1 and 1.0 wt-% silver oxide and, for the halogens chlorine and bromine together, between 0.20 and 10 wt-%. The weight proportion of bromine and chlorine in the batch may vary from a ratio of bromine to chlorine of 0–5 to 3–4, preferably 0–0.55 to 2.74. Copper oxide (CuO) may be added for sensitization in amounts between 0 and 0.1 wt-%.

The evaporation of the halides depends on the melting unit for the glass preparation. The amount of halide which remains in the glass depends on the procedure followed. So a more effective method of determination is given by analyzing the produced glass with RFA (see infra). Especially the desirable content of chlorine and bromine in the glass is between 0.2 and 1.0 wt-% in total, preferably between 0.35 and 0.87 wt-% with a preferable weight ratio of bromine to chlorine of 1.8 to 4.0. Thus, the correct amounts to be added to the batch can readily be determined by simple testing of products of trial runs.

The preferred composition of the glasses (batch or synthesis basis) in accordance with the invention can therefore be characterized by the following ranges:

|  | Broad Ranges | Optimum Ranges |
|---|---|---|
| $SiO_2$ | 12.1 to 13.9 wt % | 13.0 to 13.9 wt % |
| $P_2O_5$ | 30.4 to 33.9 wt % | 31.2 to 33.9 wt % |
| $Al_2O_3$ | 22.5 to 25.7 wt % | 22.5 to 25.7 wt % |
| $ZrO_2$ | 1.0 to 2.6 wt % | 1.2 to 2.1 wt % |
| $Na_2O$ | 3.0 to 7.5 wt % | 4.7 to 7.5 wt % |
| $K_2O$ | 5.3 to 10.5 wt % | 6.5 to 10.4 wt % |
| CaO | 3.1 to 5.0 wt % | 3.1 to 4.5 wt % |
| BaO | 3.1 to 7.0 wt % | 5.5 to 7.0 wt % |
| SrO | 0 to 0.5 wt % | 0 to 0.3 wt % |
| PbO | 0.4 to 2.5 wt % | 0.4 to 2.5 wt % |
| $TiO_2$ | 0.1 to 0.6 wt % | 0.1 to 0.6 wt % |
| $La_2O_3$ | 0.00 to 2.0 wt % | 0.05 to 2.0 wt % |
| $Ag_2O$ | 0.10 to 1.0 wt % | 0.10 to 1.0 wt % |
| CuO | 0 to 0.1 wt % | 0 to 0.05 wt % |
| Cl + Br | 0.20 to 10.0 parts per 100 parts of oxides | 0.20 to 10.0 parts per 100 parts of oxides |

Chlorine and bromine are used in an amount sufficient to provide 0.2–1.0 wt.% of chlorine plus bromine in the glass. The glass contains 0.05–0.5 wt.% silver.

The examples of composition (batch or synthesis basis) given in Table 5 include the compositions of the invention (Examples 39 and 54), and also include a lot of compositions which do not fall within the scope of the invention; the property values given in Tables 6 and 7 show the narrowness of the range of compositions of the invention. In the examples, the compositions given are in wt.%, and the amount of halogen is wt. parts in the batch per 100 wt. parts of the oxides.

In all of the comparison examples, devitrification occurred, except in Example 32, in which, however, irreversible darkening occurred.

Table 5

Comparison Examples 20-38, 40-53, 55 and 56, and Examples 39 and 54 according to the invention

| No. | 20 | 21 | 22 | 23 | 24 | 25 | 26 | 27 | 28 | 29 | 30 | 31 | 32 | 33 | 34 | 35 | 36 | 37 |
|---|---|---|---|---|---|---|---|---|---|---|---|---|---|---|---|---|---|---|
| $SiO_2$ | 8.06 | 11.76 | 8.53 | 6.50 | 8.50 | 8.24 | 8.86 | 8.86 | 8.69 | 6.69 | 10.69 | 8.95 | 3.13 | 8.16 | 8.47 | 10.62 | 8.69 | 10.22 |
| $B_2O_3$ | 3.82 | 4.31 | 2.80 | 3.83 | 3.83 | 4.40 | 3.94 | 5.41 | 3.86 | 3.86 | 3.86 | 3.98 | 4.32 | 4.08 | 4.24 | 3.86 | 3.86 | 7.43 |
| $P_2O_5$ | 33.97 | 30.21 | 33.40 | 35.40 | 33.40 | 32.00 | 36.97 | 32.97 | 30.34 | 32.34 | 31.34 | 33.30 | 66.40 | 63.14 | 65.54 | 32.34 | 32.34 | 31.12 |
| $Al_2O_3$ | 23.40 | 23.87 | 23.91 | 23.91 | 23.91 | 23.93 | 19.62 | 23.62 | 25.17 | 25.17 | 22.17 | 23.86 | 8.74 | 8.10 | 8.58 | 23.17 | 23.17 | 22.30 |
| $ZrO_2$ | 1.81 | 1.40 | 2.90 | 1.90 | 1.90 | 1.90 | — | — | — | — | — | — | — | — | — | — | — | 0.93 |
| $Na_2O$ | 6.08 | 6.08 | 6.10 | 6.10 | 6.10 | 6.11 | 4.91 | 5.91 | 6.79 | 5.79 | 5.79 | 10.93 | 7.12 | 6.73 | 6.35 | 5.79 | 5.79 | 5.57 |
| $K_2O$ | 9.26 | 9.26 | 9.30 | 9.30 | 8.30 | 8.81 | 9.86 | 8.86 | 7.69 | 8.69 | 8.69 | 2.98 | 5.40 | 5.10 | — | 5.63 | 6.51 | 7.02 |
| $Li_2O$ | — | — | — | — | 1.00 | — | — | — | — | — | — | — | 0.11 | 0.10 | 2.12 | — | — | — |
| MgO | — | — | — | — | — | — | — | — | — | — | — | — | 4.32 | 4.00 | 4.24 | 3.06 | 2.18 | 1.34 |
| CaO | 3.79 | 4.79 | 3.80 | 4.80 | 2.80 | 4.20 | 3.94 | 2.40 | 3.86 | 3.86 | 5.79 | 3.98 | — | 0.08 | — | 3.86 | 3.86 | 3.72 |
| BaO | 5.37 | 5.37 | 5.39 | 4.39 | 6.39 | 4.00 | 4.92 | 4.92 | 6.76 | 4.82 | 4.82 | 4.97 | — | 0.16 | — | 4.83 | 4.83 | 4.65 |
| SrO | 0.09 | 0.09 | 0.09 | 0.09 | 0.09 | 0.07 | — | — | — | — | — | — | — | — | — | — | — | 0.47 |
| PbO | 1.81 | 0.81 | 1.81 | 2.29 | 2.76 | 1.81 | 4.92 | 4.92 | 4.83 | 6.76 | 4.83 | 4.97 | — | — | — | 4.83 | 4.83 | 1.86 |
| $TiO_2$ | 0.92 | 0.92 | 0.93 | 0.40 | — | 0.93 | — | 0.30 | — | — | — | — | — | — | — | — | — | 0.47 |
| $La_2O_3$ | 0.50 | — | — | 0.05 | — | — | 0.98 | 0.68 | 0.97 | 0.97 | 0.97 | 1.00 | — | — | — | 0.97 | 2.90 | 1.86 |
| $Ag_2O$ | 0.60 | 0.60 | 0.50 | 0.50 | 0.50 | 0.40 | 0.59 | 0.59 | 0.58 | 0.58 | 0.58 | 0.60 | 0.43 | 0.41 | 0.42 | 0.58 | 0.58 | 0.56 |
| CuO | — | — | — | — | — | — | — | — | — | — | — | — | 0.04 | 0.04 | 0.04 | — | — | — |
| Cl | 0.99 | 1.99 | 1.99 | 2.99 | 1.99 | 1.33 | 1.97 | 2.07 | 2.13 | 2.23 | 2.33 | 2.00 | 2.16 | 2.04 | 2.12 | 1.93 | 1.93 | 1.86 |
| Br | 2.99 | 1.99 | 1.99 | 0.99 | 1.99 | 1.33 | 1.97 | 1.97 | 1.93 | 1.93 | 1.93 | 2.00 | 3.24 | 3.06 | 3.18 | 1.93 | 1.93 | 1.86 |
| F | 0.54 | 0.54 | 0.54 | 0.54 | 0.54 | 0.54 | 0.49 | 0.39 | 0.28 | 0.18 | 0.08 | 0.50 | — | — | — | 0.48 | 0.48 | 0.47 |

| No. | 38 | 39 | 40 | 41 | 42 | 43 | 44 | 45 | 46 | 47 | 48 | 49 | 50 | 51 | 52 | 53 | 54 | 55 | 56 |
|---|---|---|---|---|---|---|---|---|---|---|---|---|---|---|---|---|---|---|---|
| $SiO_2$ | 9.94 | 12.65 | — | 15.50 | 19.57 | 10.13 | 5.07 | 5.08 | 6.74 | 4.74 | 4.92 | 8.81 | 4.89 | 5.03 | 4.94 | 8.82 | 13.17 | 11.50 | 14.06 |
| $B_2O_3$ | 9.94 | — | 12.62 | 6.99 | 7.83 | 12.36 | 17.43 | 18.51 | 3.35 | 18.61 | 16.72 | 6.85 | 11.75 | 8.04 | 7.91 | 6.86 | — | — | — |
| $P_2O_5$ | 30.28 | 32.39 | 32.39 | 22.49 | 24.17 | 22.49 | 22.49 | 22.57 | 38.30 | 22.50 | 30.48 | 32.78 | 32.78 | 33.68 | 37.56 | 32.85 | 32.42 | 34.21 | 36.10 |
| $Al_2O_3$ | 21.70 | 24.29 | 24.29 | 24.32 | 18.79 | 24.32 | 24.32 | 24.40 | 20.83 | 24.54 | 19.67 | 23.49 | 23.49 | 24.63 | 19.77 | 23.53 | 24.32 | 25.12 | 21 |
| $ZrO_2$ | 0.90 | 1.92 | 1.92 | 1.93 | 1.86 | 1.93 | 1.93 | 1.01 | 1.93 | 1.02 | — | — | — | — | — | — | 2.02 | 2.62 | 2.21 |
| $Na_2O$ | 5.42 | 6.07 | 6.07 | 6.08 | 5.87 | 6.08 | 6.08 | 6.10 | 7.09 | 6.14 | 5.90 | 5.87 | 4.87 | 6.03 | 6.93 | 5.88 | 6.08 | 3.00 | 8.23 |
| $K_2O$ | 8.14 | 9.11 | 9.11 | 9.12 | 8.81 | 9.12 | 9.12 | 9.15 | 8.14 | 9.20 | 8.85 | 8.81 | 9.81 | 9.05 | 7.89 | 8.82 | 9.12 | 10.91 | 5.32 |
| $Li_2O$ | — | — | — | — | — | — | — | — | — | — | — | — | — | — | — | — | — | — | 0.37 |
| MgO | — | — | — | — | — | — | — | — | — | — | — | — | — | — | — | — | — | — | 0.23 |

Table 5-continued

Comparison Examples 20–38, 40–53, 55 and 56, and Examples 39 and 54 according to the invention

| No. | 38 | 39 | 40 | 41 | 42 | 43 | 44 | 45 | 46 | 47 | 48 | 49 | 50 | 51 | 52 | 53 | 54 | 55 | 56 |
|---|---|---|---|---|---|---|---|---|---|---|---|---|---|---|---|---|---|---|---|
| CaO | 4.12 | 4.05 | 4.05 | 5.05 | 3.96 | 4.05 | 4.05 | 5.47 | 3.06 | 4.09 | 0.98 | 0.98 | — | 1.01 | 0.99 | 0.98 | 4.06 | 5.21 | 0.82 |
| BaO | 5.52 | 6.18 | 5.06 | 4.37 | 5.19 | 5.27 | 5.37 | 5.39 | 5.38 | 5.42 | 4.92 | 4.89 | 4.89 | 6.03 | 5.93 | 4.92 | 6.23 | 3.12 | 0.91 |
| SrO | 0.45 | — | 0.10 | 1.10 | 0.10 | 0.20 | 0.10 | 0.10 | 0.10 | 0.10 | 0.05 | 0.05 | 0.05 | 0.05 | 0.05 | 0.05 | 0.05 | — | 1.05 |
| PbO | 0.31 | 1.82 | 2.12 | 0.82 | 1.76 | 1.82 | 1.82 | 0.43 | 2.83 | 1.84 | 4.92 | 4.89 | 4.89 | 6.03 | 5.93 | 4.92 | 1.42 | — | 1.20 |
| $TiO_2$ | 0.45 | 0.41 | 0.91 | 0.91 | 0.88 | 0.91 | 0.91 | 0.46 | 0.91 | 0.46 | — | — | — | — | — | — | 0.30 | 0.12 | 1.42 |
| $La_2O_3$ | 1.81 | 0.50 | — | — | — | — | — | — | — | — | 1.48 | 1.47 | 1.47 | — | 1.68 | 1.47 | 0.20 | 0.05 | 3.72 |
| $Ag_2O$ | 0.54 | 0.61 | 0.61 | 0.61 | 0.59 | 0.61 | 0.61 | 0.61 | 0.61 | 0.61 | 0.59 | 0.62 | 0.59 | 0.40 | 0.40 | 0.39 | 0.56 | 0.35 | 0.27 |
| CuO | — | — | — | — | — | — | — | — | — | — | 0.04 | 0.01 | 0.04 | 0.03 | 0.03 | 0.04 | 0.04 | — | — |
| Cl | 1.81 | 2.02 | 2.02 | 2.02 | 1.96 | 2.02 | 2.02 | 2.03 | 2.03 | 2.05 | 1.96 | 1.96 | 1.96 | 1.30 | 1.28 | 1.27 | 2.23 | 0.97 | 1.23 |
| Br | 1.81 | 2.02 | 2.02 | 2.02 | 1.96 | 2.02 | 2.02 | 2.03 | 2.03 | 2.05 | 1.96 | 1.96 | 1.96 | 2.01 | 1.98 | 1.96 | 7.60 | 3.82 | 0.90 |
| F | 0.45 | | 0.71 | 0.71 | 0.68 | 0.71 | 0.71 | 0.71 | 0.71 | 0.72 | 0.49 | 0.49 | 0.49 | — | 0.49 | — | — | — | — |

TABLE 6 [5]

| No. | 20 | 21 | 22 | 23 | 24 | 25 | 26 | 27 | 28 |
|---|---|---|---|---|---|---|---|---|---|
| OEG [° C] [1] | 970 | 950 | 975 | 985 | 975 | 950 | 1020 | 900 | 1035 |
| UEG [° C] [2] | 700 | 725 | 730 | 725 | 738 | 720 | 700 | 710 | 710 |
| KG max [° C] [3] | | | | | | | | 845 | |
| Speed μ/min [4] | 7.3 | | 6.2 | | | >25 | >15 | 5.3 | |
| Beginning of dense devitrification (° C) | 935 | 935 | 940 | 925 | 925 | 910 | 990 | | All dense white |

| No. | 29 | 30 | 31 | 32 | 33 | 34 | 35 | 36 | 37 |
|---|---|---|---|---|---|---|---|---|---|
| OEG [° C] | >1035 | >1635 | 990 | No devitrification | 1035 | >1075 | >1075 | >1075 | >1075 |
| UEG [° C] | <750 | <700 | <700 | | <700 | <700 | <700 | <700 | <700 |
| KG max [° C] | | | | | 910 | 1020 | | | |
| Speed μ/min | | | | | 2.2 | 3 | | | |
| Beginning of dense devitrification (° C) | All Dense White | All Dense White | All Dense White | | | | 1025 | Dense White | Dense White |

[1]Liquidus temperature
[2]Lower crystallization limit
[3]Maximum temperature of crystallization
[4]Growth rate of crystallization (μ = microns)
[5]For test procedures, see infra.

| No. | 38 | 39 | 40 | 41 | 42 | 43 | 44 | 45 | 46 |
|---|---|---|---|---|---|---|---|---|---|
| OEG [° C] | >1075 | No Devitrification | >945 | >1075 | 1075 | 1075 | 1060 | 1065 | 980 |
| UEG [° C] | <700 | | <750 | <750 | <750 | <750 | <750 | <750 | 765 |
| KG max [° C] | | | | | | | | | |
| Speed μ/min | | | | | | | | | 6 |
| Beginning of dense Divitrification (° C) | Dense White | | 920 | Dense White | Dense White | 1075 | 1020 | 1065 | 970 |

| No. | 47 | 48 | 49 | 50 | 51 | 52 | 53 | 54 | 55 |
|---|---|---|---|---|---|---|---|---|---|
| OEG [° C] | 1055 | >1020 | >1025 | >1025 | >1025 | >1025 | >1025 | NO Devitrification | 923 |
| UEG [° C] | <750 | <720 | <720 | <720 | <720 | <720 | <720 | | 795 |
| KG max [° C] | | | | | | | | | 815 |
| Speed μ/min | | >15 | | | | | | | 0.8 |
| Beginning of dense Divitrification (° C) | 1030 | | All Dense White | All Dense White | All Dense White | All Dense White | All Dense White | | |

Table 7[4]

| | 22 | 24 | 28 | 32 | 33 | 34 | 39 | 44 | 45 |
|---|---|---|---|---|---|---|---|---|---|
| $\alpha \times 10^{7}$ [1] | 109.6 | | | 108.6 | 106.1 | 105.3 | 103.5 | 105.6 | 103.5 |
| Tg [° C] | 463 | | | 462 | | | | 451 | |
| Ew [° C] [2] | 629 | | | | | | | 615 | |
| Va [° C] [3] | 882 | | | | | | | 858 | |
| Hydrolytic Determination, titrated ml HCl | 0.081 | | 0.70 | 0.92 | 0.41 | 0.22 | 0.12 | 0.41 | 0.32 |
| Chemical case hardening thickness in μm [5] | 45 | 17 | 42 | 58 | 55 | 32 | 65 | 50 | 22 |
| Compressive tension [nm/cm] | 3900 | 2500 | 6000 | 4500 | 5200 | 2100 | 3200 | 4600 | 3000 |
| Saturation transmission % | 35 | 42 | 43 | Irreversible darkening | Irreversible darkening | 47 | 28 | 39 | 38 |
| % regeneration after 10 minutes | 17 | 12 | 10 | | | 10 | 20 | 18 | 14 |
| $n_d$ | 1.5225 | | | | | 1.5232 | 1.5229 | 1.5311 | 1.5238 |

| | 46 | 47 | 48 | 49 | 51 | 53 | 54 | 55 | 56 |
|---|---|---|---|---|---|---|---|---|---|
| $\alpha \times 10^{7}$ | | 104.3 | | 105.4 | | 108.0 | 103.5 | | |
| Tg [° C] | | 438 | | 435 | 440 | 441 | 513 | 510 | |
| Ew [° C] | | | | 584 | | 596 | 717 | | |
| Va [° C] | | | | 837 | 811 | 844 | 987 | | |
| Hydrolytic Determination, titrated ml HCl | | | | 0.31 | 0.10 | 0.22 | 0.09 | 0.25 | |
| Chemical Case | 76 | 55 | 70 | 36 | 30 | 42 | 80 | 72 | |

Table 7(4)-continued

| | 46 | 47 | 48 | 49 | 51 | 53 | 54 | 55 | 56 |
|---|---|---|---|---|---|---|---|---|---|
| Hardening thickness in μm | | | | | | | | | |
| Compressive Tension [nm/cm] | 5800 | 5000 | 7500 | 3200 | 3000 | 3800 | 8900 | 7000 | |
| Saturation transmission % | | 25 | 23 | 18 | 18 | 34 | 22 | 30 | Irreversible darkening |
| % Regeneration after 10 minutes | | 20 | 17 | 10 | 12 | 17 | 28 | 29 | Irreversible darkening |
| $n_d$ | | 1.5181 | 1.5230 | 1.5133 | 1.5170 | 1.5231 | 1.5231 | 1.5237 | |

[1]20–300° C
[2]EW = softening temperature according to ASTM
[3]Va = working temperature according to ASTM
[4]For test procedures, see infra.
[5]μm = microns

EXAMPLES

The phototropic properties of the following base glass composition (batch or synthesis basis) of the invention have been studied:

| | | |
|---|---|---|
| $SiO_2$ | 13.17 wt % | introduced as clean sand |
| $P_2O_5$ | 32.42 wt % | introduced as phosphorous pentoxide |
| $Al_2O_3$ | 24.32 wt % | introduced as aluminum hydrate |
| $ZrO_2$ | 2.03 wt % | introduced as zirconium oxide |
| $Na_2O$ | 6.08 wt % | introduced as soda, nitrate and chloride |
| $K_2O$ | 9.12 wt % | introduced as potash and bromide |
| CaO | 4.06 wt % | introduced as carbonate |
| BaO | 6.23 wt % | introduced as carbonate and nitrate |
| SrO | 0.05 wt % | introduced as nitrate |
| PbO | 1.42 wt % | introduced as minium |
| $TiO_2$ | 0.30 wt % | introduced as oxide |
| $La_2O_3$ | 0.20 wt % | introduced as oxide |
| | 99.40 | |

To various individual batches of this base glass, various quantities of silver and halogen components were introduced in the form of silver nitrate and sodium chloride or potassium bromide but with constant preparation procedure to get appropriate RFA-values of the silver and halide concentration (see infra); from time to time the CuO sensitizing agent, introduced as copper oxide, was varied also. After the batch was mixed, the components were placed together in a platinum melting crucible. The crucible was of 1 liter size; batches were 2.5 kg. The batch was heated from room temperature to 1435° C in 10 minutes, held at 1435° C for 2 hours, 20 minutes, and refined by stirring at 1435° C for 10 minutes. The batch was then cooled to 1200° C in 10 minutes, poured into steel molds, and cooled at about 22° per hour to room temperature. Then specimens were prepared from each glass with the dimensions 40 × 40 × 5 mm. These specimens were heated at a rate of 50° every 10 minutes up to 615° C, held at this temperature for 115 minutes, and then cooled down at 190° per hour to 300° C. The rest of the cooling down to room temperature was performed at 50° per hour. With these specimens, the relative content of Ag, Cl and Br was tested by X-ray fluorescent analysis (RFA-values, see infra), and the index of refraction, the phototropy and the degree of crystallinity of the precipitates which are the agents of the phototropy, as well as the size of the precipitates were determined. Table 8 shows the results. The addition of only 0.10 wt-% F resulted, for example, in crystallization of the agents of phototropy.

The index of refraction $n_d$ was determined with commercial Abbe refractometers. The viscosity was measured in relation to temperature with commercial rotational viscosimeters. The chemical stability was identified by the titrimetrically determined values of the alkali leaching in accordance with DIN No. 12,111. The ion exchange was judged by preparing thin sections of ion-exchanged glass, the section being taken perpendicularly to the surface of the glass. The thickness of the ion exchange layer and the compressive tension prevailing therein were determined by optical measurements with polarized light. The resistance of a glass to devitrification was tested by heat treating with temperature gradients in a furnace for a period of 60 minutes, the glass being protected against vaporization at the surface. After this treatment the upper devitrification limit (= liquidus temperature, OEG), the lower devitrification limit (UEG), the crystallization maximum ($KG_{max}$) and the growth rate of the crystals were determined microscopically. The thermal expansion and the transformation temperature were determined with the dilatometer.

The darkening action and regeneration of phototropic glasses was measured as the monochromatic transmission measurement at 545 nm as a function of time. The excitation was performed with unfiltered xenon light of an intensity of 2 cal $cm^{-2} min^{-1}$. Unless otherwise noted, the temperature during the measurement was 20° C and the thickness of the glass 2 mm. All glasses had more than 86% transmission, most 90% transmission. Difference of transmission was calculated as difference before and after excitation.

The electron microscope studies were performed on specimens which had been thinned by the ion steel etching process. This process has the advantage over other thinning processes that the specimens do not come in contact with liquids and solutions during the thinning process or thereafter, and thus there is no contamination of the specimens when they are floated and reacted, because the specimen is fastened to the object holder of the electron microscope during the thinning process and enters the electron microscope together with the object holder, without any other treatment. The avoidance of liquids and solutions also prevents hydration of the specimens. Consequently the structures which are visible in or on the specimen when it is irradiated are clearly attributable to the specimen. If, however, processes are used in which the specimen comes in contact with liquids, crystalline reaction products are often found which can be attributed to reactions between the glass surface and the liquid. On the basis of the specimens thinned with ions, when irradiated with electrons, conclusions may be reached from the contrast as to the presence and the distribution of substances having unequal mass absorption. By means of electron diffraction photographs and fine-range electron diffraction photographs additional information can be obtained on the crystal structure in the matrix and phase separation areas of the phototropic glasses under study.

More particularly, crystallinity herein is determined as follows. The glass is annealed 2.5 hours at the temperature which belongs to a viscosity of $10^{14}$ poise, so that the diffusion rate and diffusing amount is the same for all samples. After this precipitation of the phase separations, the crystallinity is measured with an electron microscope by electron beam bending using a Siemens Elmiscope Type E1A for selected area diffraction patterns producing electron diffraction patterns of the original glass, thinned by ion sputtering. To be secure that no changes of structure occurred during preparation and analysis, thinned silver chloride samples were tested.

By heating by increasing the electron density in the beam, no changes occur. The degree of crystallinity is determined from three samples in randomly specified areas and calculated as percent. The figure in % gives the amount of all silver- and halide-rich phase separacomparison. In Example 58 the silver is of such a high value, though barely below 0.5 weight percent, that the resultant glass does not have sufficient non-crystalline separation phase to yield the desired phototropic properties, noting in particular the very poor regeneration properties of the glass. In 60 the Ag is too high; and in 67 the Ag is too low. In the examples of the invention the amount of silver halide crystals is less than 10%.

The RFA-values given in Table 8 show the relative concentrations with reference to the standard samples. The wet chemical analyses showed, that the relative concentration 1 (RFA-value) for silver oxide corresponds to 0.22 wt-% $Ag_2O$, for bromine to 0.26 wt-% Br, and for chlorine to 0.24 wt-% Cl. The calculated wt-% of silver, chlorine and bromine are included.

From the analytical evaluation and from the desired and achieved phototropic properties of the glass, the limit of concentrations, in the glass, of $Ag_2O$ and the halides chloride and bromine were determined as 0.05 to 0.5 weight % $Ag_2O$ and 0.2 to 1.0, preferably 0.35 to 0.87 weight %, of bromine and chlorine, and a preferred weight ratio of bromine to chlorine of 1.8 to 4.0.

Table 8

| | | 57 | 58 [1] | 59 | 60 [1] | 61 | 62 | 63 | 64 | 65 | 66 | 67 [1] |
|---|---|---|---|---|---|---|---|---|---|---|---|---|
| | | (Base Composition Given Above) | | | | | | | | | | |
| Synthesis | $Ag_2O$ [2] | 0.51 | 1.20 | 0.51 | 1.35 | 0.76 | 0.56 | 0.51 | 0.35 | 0.30 | 0.39 | 0.35 |
| | Cl [2] | 2.23 | 2.23 | 4.54 | 7.70 | 2.23 | 2.23 | 2.23 | 2.23 | 2.23 | 0.78 | 1.00 |
| | Br [2] | 5.60 | 5.60 | 5.47 | 10.40 | 7.60 | 7.60 | 6.10 | 5.00 | 3.10 | 1.43 | 2.00 |
| | CuO [2] | 0.04 | 0.04 | 0.02 | 0.04 | 0.01 | 0.04 | 0.04 | 0.04 | 0.04 | 0.03 | 0.04 |
| Analysis | | | | | | | | | | | | |
| RFA-value | Ag | 0.838 | 1.927 | 0.764 | 1.973 | 0.867 | 0.803 | 0.950 | 0.821 | 0.738 | 0.821 | 0.532 |
| wt. % | $Ag_2O$ | 0.18 | 0.49 | 0.13 | 0.51 | 0.17 | 0.15 | 0.20 | 0.15 | 0.12 | 0.15 | 0.04 |
| RFA-value | Cl | 0.86 | 0.80 | 0.86 | 1.25 | 0.90 | 0.89 | 0.71 | 0.95 | 0.75 | 0.58 | 0.60 |
| wt. % | Cl | 0.20 | 0.15 | 0.20 | 0.34 | 0.19 | 0.19 | 0.11 | 0.23 | 0.13 | 0.12 | 0.07 |
| RFA-value | Br | 1.660 | 1.602 | 2.549 | 2.361 | 1.417 | 1.837 | 1.617 | 1.814 | 1.986 | 0.97 | 1.347 |
| wt. % | Br | 0.42 | 0.41 | 0.67 | 0.61 | 0.36 | 0.47 | 0.42 | 0.47 | 0.51 | 0.24 | 0.34 |
| Phototropy | | | | | | | | | | | | |
| Transmission Unilluminated % | | 93 | 85 | 90 | 82 | 92.5 | 92.5 | 93 | 92 | 93 | 93 | 92.5 |
| Saturation Transmission % | | 36 | 46 | 50 | 21 | 19.2 | 26 | 22 | 35 | 37 | 47 | 14 |
| 50% Regeneration Time (min.) | | 7.7 | >40 | 6 | >40 | 14 | 12 | 12 | 8.4 | 8.5 | 7 | >20 |
| % Regeneration After 10 minutes | | 30.5 | 10 | 18 | 5 | 21.3 | 26.5 | 26 | 30.5 | 30.0 | 29 | 17.5 |
| Size of phase Separation (A) | | 170 | 290 | 190 | 350 | 130 | 150 | 210 | 160 | 150 | 160 | 170 |
| Nature of Phase Separation | | glassy | crystalline | glassy | crystalline | glassy | glassy | glassy | glassy | glassy | glassy | glassy |
| index of refraction | | 1.5230 | 1.5232 | 1.5229 | 1.5230 | 1.5230 | 1.5231 | 1.5230 | 1.5229 | 1.5228 | 1.5231 | 1.5230 |
| thermal expansion coefficient (20–300° C) | | 102.3 | 102.6 | 102.2 | 102.4 | 102.2 | 102.3 | 102.3 | 102.4 | 102.4 | 102.3 | 102.5 |
| Devitrification | | All glasses show no devitrification between $10^2$ and $10^{14.5}$ poise. | | | | | | | | | | |
| chemical stablity in ml HCl (DIN 12111) | | 0.08 | 0.10 | 0.08 | 0.07 | 0.06 | 0.11 | 0.06 | 0.07 | 0.07 | 0.06 | 0.07 |
| Ionexchange strengthened | | All strengthened at 410° C for 4 h achieved layer thicknes >60 μm, compressive strength >4000 nm/cm | | | | | | | | | | |

[1] Comparison examples.
[2] Parts per 100 parts of base mixture.

tions, which are found to be crystals. The remainder (100% minus the % crystals) is the % of non-crystalline phase-separations. This % crystals is referred to herein as % silver halide crystals.

The data is reported in Table 8, wherein the composition figures are parts by weight per 100 parts by weight of the base glass batch. RFA means X-ray fluorescent analysis with the Siemens SRS 1 instrument. The analyzing crystals were LiF for Br and Ag and PET-crystals for Cl. Wet chemicals analysis standards were used to correlate the RFA values.

Examples 57, 59, 61, 62 to 66 are according to the invention; the remaining examples, 58, 60 and 67, are for The linear thermal expansion coefficient of phosphate glasses or glasses which contain phosphate as main component, often is higher than $105 \times 10^{-7}$ per ° C between 20° and 300° C. The combination of the components alkali oxide, alkaline earth oxide and lead oxide normally brings a magnification of the expansion coefficient. A usual way to lower the expansion coefficient is by using boric oxide or fluorine. In the glass of the invention, avoiding such use of boric oxide and fluorine, the lowering of the expansion into an appropriate preferred area from 99 to 105 × $10^{-7}$ per ° C for better technical properties is achieved by the special combination of the components $SiO_2$, $P_2O_5$, $Al_2O_3$, $ZrO_2$, $Na_2O$, $K_2$, CaO, BaO, SrO, PbO, $TiO_2$, $La_2O_3$, $Ag_2O$, CuO and the halides Cl and Br. Higher and lower expansion coefficient can be achieved by varying the compositions within the scope of the invention.

Examples 68–71 according to the invention are reported in Table 9. The data for Examples 39 and 54, which appear above with comparison examples in Table 5, are also reported in Table 9. In Examples 39, 54 and 68–71 the % silver halide crystals is less than 10%.

Table 9

| wt % in synthesis | 39 | 54 | 68 | 69 | 70 | 71 |
|---|---|---|---|---|---|---|
| $SiO_2$ | 12.65 | 13.17 | 13.00 | 13.85 | 12.15 | 13.76 |
| $P_2O_5$ | 32.39 | 32.42 | 32.33 | 30.45 | 33.81 | 32.60 |
| $Al_2O_3$ | 24.29 | 24.32 | 22.56 | 25.68 | 25.59 | 23.66 |
| $ZrO_2$ | 1.92 | 2.02 | 1.25 | 1.65 | 2.56 | 1.05 |
| $Na_2O$ | 6.07 | 6.08 | 4.72 | 7.45 | 3.54 | 4.95 |
| $K_2O$ | 9.11 | 9.12 | 10.37 | 5.50 | 9.25 | 9.75 |
| CaO | 4.05 | 4.06 | 4.72 | 3.26 | 4.85 | 3.92 |
| BaO | 6.18 | 6.23 | 5.57 | 6.95 | 6.20 | 6.20 |
| SrO | — | 0.05 | — | 0.02 | 0.01 | — |
| PbO | 1.82 | 1.42 | 2.42 | 2.49 | 0.79 | 2.42 |
| $TiO_2$ | 0.41 | 0.30 | 0.15 | 0.59 | 0.18 | 0.40 |
| $La_2O_3$ | 0.50 | 0.20 | 1.98 | 1.90 | 0.10 | 1.00 |
| $Ag_2O$ | 0.61 | 0.56 | 0.89 | 0.18 | 0.95 | 0.29 |
| CuO | — | 0.04 | 0.05 | 0.03 | 0.02 | — |
| Cl 100% | 2.02 | 2.23 | 0.70 | 0.97 | 1.42 | 1.05 |
| Br | 2.02 | 7.60 | 0.90 | 1.80 | 1.88 | 1.76 |
| Phototropy and other essential properties | | | | | | |
| Transmission Unilluminated | 92% | 93% | 92% | 92% | 92% | 91% |
| Saturation transmission | 28% | 22% | 25% | 33% | 26% | 29% |
| % Regeneration after 10 min | 20% | 28% | 23% | 28% | 32% | 32.5% |
| Size and structure of phase-separation | 160 A | 170 A | 250 A | 200 A | 100 A | 70 A |
| crystallization | glassy | glassy | glassy | glassy | glassy | glassy |
| | | All glass show no crystallization in the viscosity range between $10^1$ and $10^7$ poises | | | | |
| Refractive index $n_d$ | 1.5229 | 1.5231 | 1.5229 | 1.5237 | 1.5226 | 1.5230 |
| lin.therm.expansion $\times 10^{-7}$/° C. (20–300° C) | 103.5 | 103.5 | 101.6 | 99.1 | 100.6 | 100.8 |
| chemical durability in ml HCl according D1N | 0.12 | 0.09 | 0.03 | 0.08 | 0.12 | 0.05 |
| Layer thickness and compression after chemical strengthening in $KNO_3$-Saltbath | 65 μm 3200 nm/cm | 80 μm 8900 nm/cm | 85 μm 6200 nm/cm | 70 μm 6500 nm/cm | 58 μm 6000 nm/cm | 90 μm 7200 nm/cm |

As mentioned above the glasses of the invention are best free of boric oxide. In Table 10 three known glasses free of boric oxide are reported. In these glasses the silver halide is mostly crystalline. Apart from boric oxide, the glasses fail to come within the composition according to the invention, e.g. in Example 72, the $P_2O_5$ content; in Examples 73 and 74, the $SiO_2$ content.

Table 10

| | Comparison Examples | | |
|---|---|---|---|
| weight % | 72 | 73 | 74 |
| $P_2O_5$ | 41.7 | 37.0 | 34.6 |
| $Al_2O_3$ | 25.4 | 21.5 | 24.8 |
| $SiO_2$ | 14.8 | 7.5 | 8.7 |
| MgO | 4.2 | 4.3 | 3.2 |
| $K_2O$ | 12.8 | 7.0 | 7.9 |
| $Na_2O$ | 0.7 | 6.0 | 6.6 |
| F | 0.2 | 0.1 | 0.4 |
| CaO | — | 9.0 | 7.0 |
| BaO | — | 6.7 | 6.6 |
| $TiO_2$ | — | 0.9 | 0.47 |
| refractive-index nd | 1.4785 | 1.5375 | 1.5285 |
| crystallization OEG | 1142° C | 1025° C | 1038° C |
| UEG | 615° C | 600° C | 685° C |
| $KG_{max}$ | 932° C | 910° C | 917° C |
| Growth rate | 45 μm/min | >25 μm/min | 32 μm/min |
| structure of carriers of phototropy (% Silver halide crystals) | fully crystalline | more than 80% crystalline | >70% crystalline |

Table 10-continued

| | Comparison Examples | | |
|---|---|---|---|
| weight % | 72 | 73 | 74 |
| chemical stability in ml HCl according DIN 12111. | 0.68 | 1.02 | 0.97 |

In Table 11, effects of composition on crystallinity are indicated. Example 75 is substantially the same as Example 54 (invention) in Tables 5 and 9; Examples 76 and 77 (comparison) demonstrate a change in crystallinity with increase in $P_2O_5$ content and decrease of $Al_2O_3$, $ZrO_2$, $SiO_2$ and CaO; Example 78 is according to the invention; Example 79 (comparison) contains no silica; and Example 80 (comparison) contains only 8.5% silica and 4% $B_2O_3$. Examples 79 and 80 are known glasses.

Table 11
Examples 75 and 78, the Invention; Examples 76, 77, 79 and 80, Comparisons.

| in weight % | 75 | 76 | 77 | 78 | 79 | 80 |
|---|---|---|---|---|---|---|
| $SiO_2$ | 13.17 | 1.67 | 11.17 | 13.47 | — | 8.50 |
| $P_2O_5$ | 32.42 | 35.42 | 38.42 | 33.00 | 34.20 | 35.50 |
| $Al_2O_3$ | 24.32 | 24.32 | 22.32 | 22.70 | 24.20 | 21.00 |
| $B_2O_3$ | — | — | — | — | 16.70 | 4.00 |
| $ZrO_2$ | 2.02 | 0.52 | 0.52 | 2.00 | 2.94 | 0.91 |
| $Na_2O$ | 6.08 | 6.08 | 6.08 | 6.37 | 6.38 | 6.00 |
| $K_2O$ | 9.12 | 9.12 | 9.12 | 9.22 | 8.14 | 9.00 |
| CaO | 4.06 | 4.06 | 3.06 | 4.45 | 4.42 | 7.70 |
| BaO | 6.23 | 6.23 | 6.23 | 6.80 | — | 4.30 |
| MgO | — | — | — | — | — | 2.00 |
| SrO | 0.05 | 0.05 | 0.05 | 0.08 | — | — |
| PbO | 1.42 | 1.42 | 1.42 | 0.50 | — | — |
| $TiO_2$ | 0.30 | 0.30 | 0.30 | 0.60 | 2.94 | 1.00 |
| $La_2O_3$ | 0.20 | 0.20 | 0.20 | — | — | — |
| $Ag_2O$ | 0.32 | 0.32 | 0.32 | 0.32 | 0.32 | 0.32 |
| CuO | 0.04 | 0.04 | 0.04 | 0.04 | 0.04 | 0.04 |
| Cl + B | 0.45 | 0.45 | 0.45 | 0.45 | 0.45 | 0.45 |
| F | — | — | — | — | 0.47 | 0.13 |
| time of annealing | 2.5 h | 2.5 h | 2.5 h | 2.5 h | 2.5 h | 2.5 h |
| viscosity of | | | | | | |

Table 11-continued

Examples 75 and 78, the Invention;
Examples 76, 77, 79 and 80, Comparisons.

| in weight % | 75 | 76 | 77 | 78 | 79 | 80 |
|---|---|---|---|---|---|---|
| annealing | $10^{14.5}$p | $10^{14.5}$p | $10^{14.5}$p | $10^{14.5}$p | $10^{14.5}$p | $10^{14.5}$p |
| amount of silverhalide crystals in comparison to all silverhalide rich phase-separations | <10% | >25% | about 80% | <5% | >95% | >70% |

More detailed studies of chemical strengthening were performed, for example on the compositions of comparison Examples 22 and 25 and on the composition of Example 54 of Table 5. Table 12 shows the results in relation to the duration of the ion exchange and the temperature involved. The strengthening was performed in a $KNO_3$ molten salt bath. It can be seen from Table 12 that the composition of the invention (Example 54) has superior properties.

Table 12

| | Chemical Strengthening | | |
|---|---|---|---|
| Temperature [°C] | Time [h] | Layer Thickness [μm] | Compressive Tension [mn/cm] |
| Composition 22: | | | |
| 400 | 16 | 18 | 1870 |
| 450 | 16 | 23 | 1850 |
| 480 | 16 | 45 | 3900 |
| Composition 25: | | | |
| 390 | 16 | 25 | 3600 |
| 400 | 16 | 30 | 3300 |
| 410 | 16 | 35 | 3200 |
| 420 | 16 | 35 | 2340 |
| 430 | 16 | 38 | 2060 |
| Composition 54: | | | |
| 400 | 16 | | Tension-free |
| 410 | 4 | 24 | 2940 |
| 410 | 16 | 38 | 6000 |
| 430 | 2 | 25 | 1300 |
| 430 | 4 | 30 | 5400 |
| 430 | 16 | 59 | 6980 |
| 440 | 16 | 55 | 6720 |
| 450 | 2 | 28 | 3940 |
| 450 | 4 | 46 | 3340 |
| 450 | 16 | 75 | 7300 |
| 450 | 16 | 60 | 5800 |
| 470 | 2 | 18 | 2960 |
| 470 | 4 | 49 | 6400 |
| 470 | 16 | 75 | 8920 |
| 470 | 16 | 77 | 7480 |
| 490 | 2 | 45 | 6220 |
| 490 | 4 | 52 | 7180 |
| 490 | 16 | 87 | 7100 |
| 510 | 2 | 45 | 7200 |
| 510 | 4 | 59 | 6880 |

SUMMARY

Thus, the invention provides a phototropic glass comprising at least one glass forming oxide whose inter-unit bond is weaker than the inter-unit bond of $SiO_4$ units in silicate glass, containing $P_2O_5$ as the principal glass forming component, and deposits rich in silver and halogen imparting phototropy to the glass. Desirably, the glass has a darkening of at least 50% transmission difference and a regeneration of the transmission after about 10 minutes of at least 20% after the end of the illumination, on the basis of the tests which are the subject of Table 8.

The glass can contain non-crystalline silver-rich and halogen-rich phase deposits in the size range of 40-350 A (Angstroms). Additionally the glass desirably has a sufficient chemical stability, characterized by a titration value in accordance with DIN No. 12,111 of less than 0.2 ml HCl.

Desirably the glass is fluorine free, and also free of boric oxide, and magnesium oxide.

The glasses are silicate-alumino-phosphate glasses containing:

| | wt.% |
|---|---|
| $SiO_2$ | 12–14 |
| $P_2O_5$ | 30–34 |
| $Al_2O_3$ | 22–26 |
| $B_2O_3$ | 0–2 |
| Alkali oxide | > 8 | and deposits of non-crystalline silver-halide phase imparting phototropy to the glass, the amount of silver in the glass being greater than 0.05 wt.% calculated as $Ag_2O$, and the amount of silver halide crystals in the glass being less than about 10%. The compositions of the invention are distinctive in that ophthalmic pressings thereof can be made by normal production procedures for such pressings.

What is claimed is:

1. A phototropic glass having the following starting composition in weight percent:

| | |
|---|---|
| $SiO_2$ | 12.1 to 13.9 |
| $P_2O_5$ | 30.4 to 33.9 |
| $Al_2O_3$ | 22.5 to 25.7 |
| $ZrO_2$ | 1.0 to 2.6 |
| $Na_2O$ | 3.0 to 7.5 |
| $K_2O$ | 5.3 to 10.5 |
| CaO | 3.1 to 5.0 |
| BaO | 3.1 to 7.0 |
| SrO | 0 to 0.5 |
| PbO | 0.4 to 2.5 |
| $TiO_2$ | 0.0 to 0.6 |
| $La_2O_3$ | 0.00 to 2.0 |
| $Ag_2O$ | 0.10 to 1.0 |
| CuO | 0 to 0.1 | and at least one halogen selected from the group consisting of bromine and chlorine in an amount sufficient to provide upon analysis 0.2–1.0 wt.% of bromine plus chlorine in the glass, said glass upon analysis containing 0.05–0.5 wt.% Ag calculated as $Ag_2O$, the sum of the alkali earth oxides being 8.6–12.5 wt.%, the sum of the alkali oxides being 11.2–16.2 wt.%, wherein:

the glass contains as the essential phototropic agent a non-crystalline separation phase rich in said silver and said halogen, said silver-rich and halogen-rich, non-crystalline phase separations having a diameter between 40 and 350 A; compared to said non-crystalline separation phase, less than 10% thereof being present in a silver halide crystalline phase; the glass shows substantially no devitrification in the range between $10^1$ and $10^5$ poises;
the glass has a refractive index $n_d$ between 1.5225 and 1.5238, a linear thermal expansion coefficient between 20° and 300° C of from about 99 to about 105 × $10^{-7}$ per degree C, and a sufficient chemical stability, characterized by a titration value in accordance with DIN 12,111 of less than 0.2 ml HCl, and ophthalmic pressing thereof can be made by normal production procedures for such pressings;
the glass can be strengthened chemically by ion exchange in a medium containing potassium ions at a temperature below $10^{14.5}$ poises, whereupon alkali ions smaller than potassium diffuse out of the glass; and the glass has sufficient of said non-crystalline separation phase to possess the following phototropic properties, as determined by monochromatic transmissions at 545 nm, with excitation by an unfiltered xenon light of an intensity of 2 cal cm$^{-2}$ min$^{-1}$, at a temperature of 20° C, on 2 mm thick specimens of the glass; a darkening of at least 50% transmission difference and a regeneration of the transmission after 10 minutes of at least 20% after the end of the illumination.

2. A phototropic glass according to claim 1, containing at least 0.05 wt.% $La_2O_3$.

3. A glass according to claim 1, containing upon analysis between 0.35 and 0.87 wt.% bromine and chlorine in a weight ratio of 1.8 : 1 to 4.0 : 1, respectively.

4. A phototropic glass according to claim 1, containing upon analysis about 0.12 to about 0.20 wt.% Ag, calculated as $Ag_2O$.

5. A phototropic glass according to claim 3, containing upon analysis about 0.12 to about 0.20 wt.% Ag, calculated as $Ag_2O$.

* * * * *